Figure 1:
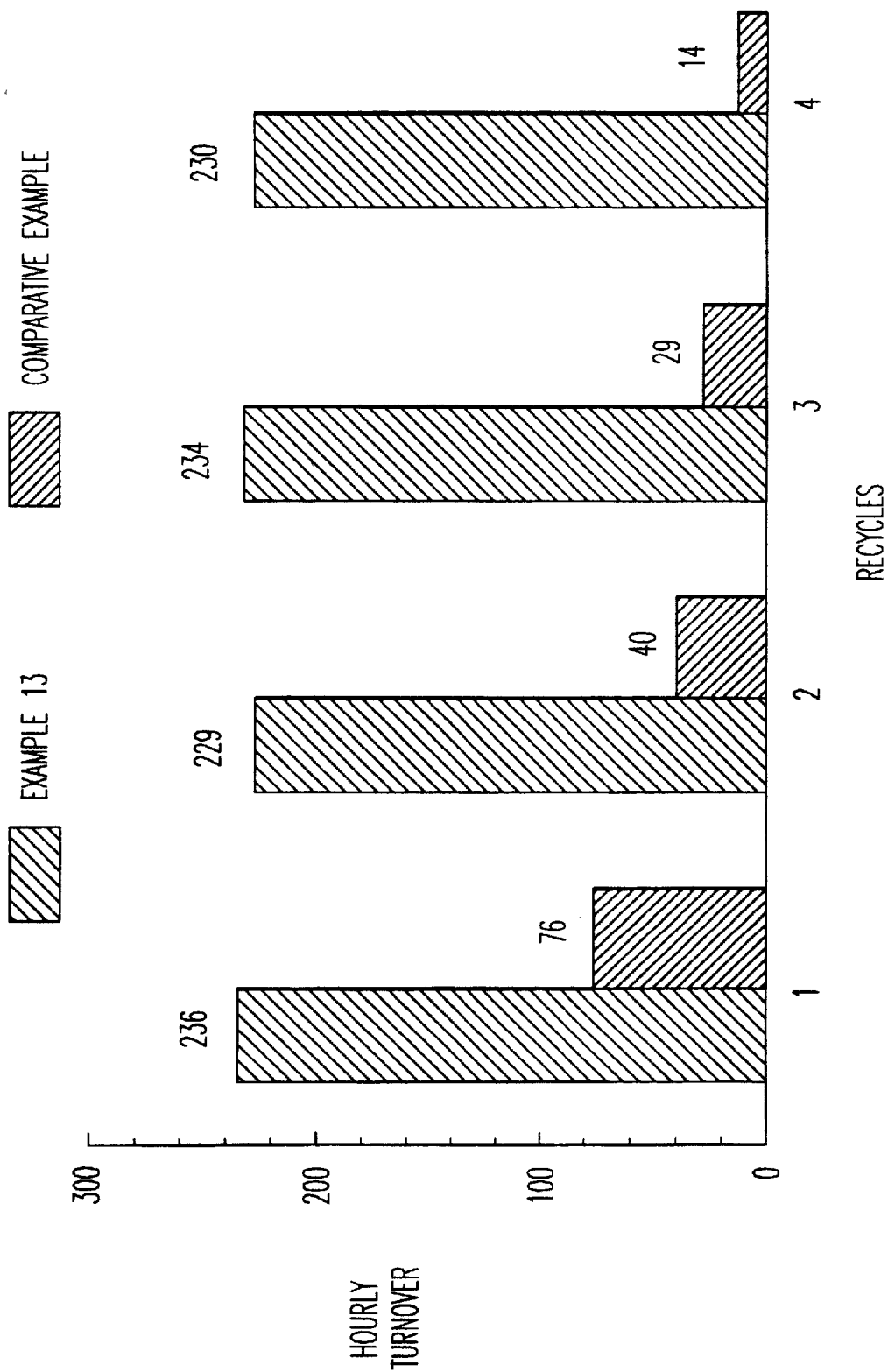

United States Patent [19]
Bianchi et al.

[11] Patent Number: 5,783,164
[45] Date of Patent: Jul. 21, 1998

[54] PROCESS FOR THE PREPARATION OF HYDROGEN PEROXIDE

[75] Inventors: Daniele Bianchi, Arese; Rossella Bortolo, Novara; Rino D'Aloisio, Novara; Marco Ricci, Novara; Sergio Soattini, Cerano, all of Italy

[73] Assignee: Enichem S.p.A., Milan, Italy

[21] Appl. No.: 844,675

[22] Filed: Apr. 21, 1997

[30] Foreign Application Priority Data

May 21, 1996 [IT] Italy ............................ MI96A1015

[51] Int. Cl.$^6$ .................................................... C01B 15/01
[52] U.S. Cl. ..................................................... 423/584
[58] Field of Search ........................................ 423/584

[56] References Cited

U.S. PATENT DOCUMENTS 4,462,978  7/1984  Brill ............................................ 423/584
4,711,772  12/1987  Jacobson ...................................... 423/584

Primary Examiner—Wayne Langel
Attorney, Agent, or Firm—Oblon, Spivak, McClelland, Maier & Neustadt, P.C.

[57] ABSTRACT

A process is described for the preparation of hydrogen peroxide by the reaction of carbon monoxide, oxygen and water in an organic solvent immiscible with water, in the presence of a catalytic complex soluble in the organic solvent, deriving from the combination of a palladium salt, a non-coordinating organic or inorganic acid and a ligand capable of binding itself to the palladium atom, characterized in that said ligand is a mono or polydentate nitrogenated compound.

34 Claims, 1 Drawing Sheet

PROCESS FOR THE PREPARATION OF HYDROGEN PEROXIDE

The present invention relates to a process for the preparation of hydrogen peroxide by the reaction of carbon monoxide, oxygen and water in an organic solvent immiscible with water, in the presence of a catalytic complex soluble in the organic solvent deriving from the combination of a palladium salt, a non-coordinating organic or inorganic acid and a ligand capable of binding itself to the palladium atom, characterized in that said ligand is a mono or polydentate nitrogenated compound.

Hydrogen peroxide is a commercially important compound which is widely used as a bleach agent in textile and paper industries, in the chemical industry in oxidation processes and in the environmental field as a biocide.

Processes for the preparation of hydrogen peroxide based on the alternating oxidation and reduction of alkylanthraquinones, are known and industrially used. These processes however substantially have disadvantages deriving from the necessity of operating with large volumes of reagents, the production, in the reduction phase, of inactive by-products and the relatively high cost of the reagents.

Other processes for the preparation of hydrogen peroxide have consequently been proposed in the art, among which those using carbon monoxide, water and oxygen and catalytic systems based on the salts of a metal belonging to group VIII, in particular salts of palladium.

For example U.S. Pat. No. 4,462,978 describes a process for the synthesis of hydrogen peroxide in a carbonyl or nitrile organic solvent, miscible or immiscible with water, which uses as catalyst a palladium salt, especially palladium chloride, without a ligand. The reaction is generally carried out in homogeneous phase, at room temperature. Operating according to this process it is possible to obtain $H_2O_2$ in concentrations of up to 0.85% by weight, with a turnover of the catalyst of 2.4.

In addition, as the palladium salt is soluble in water, during the extraction phase a part or the whole of the catalyst is removed together with the hydrogen peroxide from the reaction mixture. This is disadvantageous from an economic point of view, as the recovery of the catalyst is only possible with complex purification and separation treatment.

U.S. Pat. No. 4,711,772 discloses a process for the synthesis of hydrogen peroxide starting from carbon monoxide, water and oxygen, which uses a palladium salt as catalyst, a phosphine or arsine as ligand and a non-coordinating acid. The reaction is carried out in a biphasic solvent/water system, at room temperature, using the ligand in wide excess with respect to the catalyst. This process has disadvantages deriving from the low production yields of $H_2O_2$ and from the instability of the catalytic system under the operating conditions, mainly due to the oxidation of the ligand.

Operating according to the above patent, hydrogen peroxide is obtained with a concentration equal to 1.2% by weight, after two hours of reaction at 20° C. using a molar ratio ligand/palladium of 80:1.

A patent application has recently been filed by the Applicant, relating to the production of hydrogen peroxide from carbon monoxide, oxygen and water, which is based on the use, as organic phase, of an organic solvent in which the solubility of the water is between 0.025% and 0.035%, such as for example chlorobenzene or chloronaphthalene. In this way it is possible to improve the stability of the catalyst under the operating conditions and carry out the process in continuous or in successive cycles. Also this process however has its disadvantages as it requires a wide excess of ligand and the necessity of regenerating said ligand before reusing it.

These processes of the known art, consequently, do not have a sufficiently high productivity, referring to the quantity of hydrogen peroxide produced, to make their industrial application interesting. In addition, the catalysts used have a limited activity under the operating conditions.

It has now been found, according to the present invention, that the use of a nitrogenated ligand stable to oxidation enables the disadvantages of the known art listed above to be overcome.

The use of this nitrogenated ligand has considerable advantages, and in particular: it is possible to operate with reduced quantities of ligand; it allows a process to be carried out in continuous or with consecutive cycles without the necessity of regenerating the ligand, which would create a considerable increase in costs; it enables the preparation of hydrogen peroxide with high yields.

In accordance with this, a first aspect of the present invention relates to a process for the preparation of hydrogen peroxide by the reaction of carbon monoxide, water and oxygen in an organic solvent immiscible with water, in the presence of a catalytic complex soluble in the organic solvent, deriving from the combination of:

(a) a salt of palladium;

(b) a non-coordinating organic or inorganic acid; and (c) a ligand capable of binding itself to the palladium atom;

wherein said process is characterized in that the ligand (c) is a mono or polydentate nitrogenated compound.

The catalytic complex used in the process of the present invention can be prepared in situ, or it can be a preformed complex. In the latter case the production reaction of hydrogen peroxide can be carried out without free acid.

Monodentate nitrogenated ligands suitable for the purposes of the present invention can be nitrogenated heterocyclic compounds such as pyridine and its derivatives such as, for example, alkylpyridine.

Bidentate nitrogenated ligands can be selected from those having general formula (I)

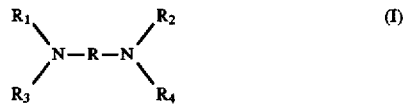

wherein: R represents a $C_2$–$C_4$ alkyl radical optionally substituted with an alkyl or aryl group; $R_1$–$R_4$, the same or different, each represent a $C_1$–$C_{10}$ alkyl radical, a $C_3$–$C_{10}$ cycloalkyl radical or a $C_6$–$C_{12}$ aromatic radical possibly substituted with a $C_1$–$C_4$ alkyl or alkoxyl radical;

or from those having general formula (II):

wherein: X and Y, the same or different, each represent a bridging organic group having at least three atoms in the bridge of which at least two are carbon atoms. When, as well as the carbon atoms, groups X and Y contain other atoms, these are preferably selected from oxygen or nitrogen.

Examples of polydentate nitrogenated ligands are: N,N,N',N'-tetramethylethylenediamine-1,2; N,N,N',N'-tetramethylpropanediamine-1,3; 2,2'-bipyridyl; 4,4'-dimethyl-2,2'bipyridyl; 4,4'-diphenyl-2,2'bipyridyl; 5,5'-dimethyl-2,2'-bipyridyl; 5-methyl-2,2'bipyridyl; 1,10-phenanthroline; 4-methyl-1,10-phenanthroline; 5-methyl-1, 10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'-bioxazole; 2,2'-bipyrimidine; 2,2'-tetrahydro-bioxazole; 2,9-dichloro-1,10-phenanthroline; 2,9-dibutylphenanthroline2,9-dimethylphenanthroline; 2,9-dimethyl-4,7-diphenyl-1,10-phenanthroline; 2,4,6-tri-(2-pyridyl)-1,3,5-triazine and 6,7-dimethyl-2,3-di(2-pyridyl)-quinoxaline.

Preferred ligands for the purposes of the present invention are 2,4,6-tri-(2-pyridyl)-1,3,5-triazine, 6,7-dimethyl-2,3-di(2-pyridyl)-quinoxaline and phenanthrolines substituted in position 2,9 such as for example: 2,9-dichloro-1,10-phenanthroline, 2,9-dimethyl-4,7-diphenyl-1,10-phenanthroline and 2,9-dibutylphenanthroline.

In the process of the present invention a molar ratio ligand/palladium is used of between 1:1 and 20:1, preferably between 3:1 and 8:1.

Examples of palladium salts which can be used in the process of the present invention can be selected from palladium acetate, palladium nitrate, palladium sulfate. Palladium acetate is preferred.

The quantity of palladium salt used in the process of the present invention is generally between 0.001 and 0.5 moles per liter of organic phase, preferably between 0.003 and 0.007 moles per liter of organic phase.

Examples of non-coordinating acids which can be used in the process of the present invention are selected from p-toluenesulfonic acid, phosphoric acid, acetic acid, sulfuric acid, trifluoroacetic acid, benzoic acid, p-toluic acid, trimethylbenzoic acid, methanesulfonic acid, benzenesulfonic acid, diphenylphosphinic acid and perfluoroalkylcarboxylic acids having the formula $C_nF_{2n+1}COOH$ wherein n is between 5 and 15, preferably between 5 and 9. P-toluenesulfonic acid, sulfuric acid and perfluorooctanoic acid are preferred.

The quantity of acid used in the process of the present invention is selected so as to obtain a molar ratio non-coordinating acid/palladium of between 1/1 and 60/1, preferably between 3/1 and 20/1.

Solvents which can be used in the process of the present invention can be aliphatic, aromatic hydrocarbons, aliphatic or aromatic chlorinated hydrocarbons, linear or cyclic ethers, ketones or alcohols, on the condition that, when the non-coordinating acid is sulfuric acid, the solvent is a mixture consisting of an alcohol and an organic solvent non-miscible with water, with a volumetric ratio of between 5:95 and 95:5 and preferably from 50:50 to 60:40.

Examples of solvents suitable for the purposes of the present invention are: benzene, toluene, chlorobenzene, dichloromethane, dichloroethane, chloroform and chloronaphthalene, 1,2,4-trichlorobenzene, methyl-terbutyl-ketone, methyl-isobutyl-ketone, acetophenone, p-fluoroacetophenone, p-methylacetophenone, anisole, benzonitrile.

The alcohols are selected from primary, secondary or tertiary aliphatic alcohols, linear or branched substituted by alkyl or aryl residues, such as for example, 2,6-dimethyl-4-heptanol, ter-amyl alcohol, ter-butyl alcohol, n-amyl alcohol, n-butanol, n-propanol, ethanol or methanol. N-propanol, n-butanol and n-amyl alcohol are preferred.

The quantity of gaseous phase, carbon monoxide and oxygen, used in the reaction is selected so as to maintain a total pressure of more than 1 atm and preferably between 5 and 100 atm. The molar ratio $CO/O_2$ is conveniently between 1:99 and 12:88, preferably between 3:97 and 10:90.

According to an embodiment of the process of the present invention, the reaction can be carried out using air instead of pure oxygen. In this case the molar ratio $CO:O_2$ is between 1:99 and 20:80, preferably between 3:97 and 15:85.

The quantity of water, which forms one of the reagents, is selected so as to generate a double phase. The volumetric ratio water:solvent is conveniently between 30:70 and 70:30 and is preferably 50:50.

The process of the present invention can be carried out in batch or in continuous using a catalytic complex which is either preformed or prepared in situ.

For example, in a batch process which uses a catalytic complex prepared in situ, the palladium salt and nitrogenated ligand are dissolved in the organic solvent and the resulting mixture is reacted at room temperature, under stirring, for a time which is necessary to guarantee the complete formation of the ligand:palladium catalytic complex.

An aqueous solution of a non-coordinating acid is added to this solution to obtain a biphasic system into which the carbon monoxide and oxygen are fed at the desired pressures and quantities, as defined above.

The reaction is typically carried out at temperatures of between −20° and 100° C. and for a period of time ranging from 15 minutes to 10 hours. It is preferably carried out at a temperature of between 20° and 80° C. and for a period of from 30 minutes to 2 hours.

At the end of the reaction, the aqueous phase containing the hydrogen peroxide, is separated from the organic phase with the usual separation techniques.

The aqueous phase can be used directly or it can be further concentrated using the known methods as described for example in patents DE-2.233.159, DE-2.125.199 and DE-1.945.754.

The organic phase containing the catalytic complex can be reused in a subsequent synthesis cycle of hydrogen peroxide operating as described above. The process can be identically repeated for a large number of cycles without deactivation of the catalytic system. The process in continuous can be carried out with the conventional techniques removing the hydrogen peroxide and $CO_2$ produced and reintegrating the reagents.

Operating within the range of general conditions specified above, an aqueous phase is discharged from the reactor, with a content of hydrogen peroxide of from 2 to about 10% by weight, with residence times of 1 to 3 hours.

The process of the present invention has the fundamental advantage of transforming the reagents into $H_2O_2$ with high yields, using reduced quantities of ligand and acid. There are obvious benefits relating to the economy of the process.

The term "hourly turnover of palladium", as used in the present description, relates to the efficiency of the catalyst and is calculated as a molar ratio between the hydrogen peroxide produced in 1 hour and the palladium charged. In the following tables, Tn/h designates hourly turnover of palladium.

The following examples, whose sole purpose is to describe the present invention in greater detail, should not be considered as restricting its scope in any way.

EXAMPLE 1

5.6 mg (0.025 mmoles) of palladium acetate, 36 mg (0.1 mmoles) of 2,9-dimethyl-4,7-diphenyl-1,10-phenanthroline (batocuproina) (molar ratio ligand:palladium=4:1) and 7 ml of a mixture of chlorobenzene:n-butanol (1:1, v:v) are charged into an autoclave equipped with a glass ampule and magnetic stirrer. The mixture is maintained under stirring, at room temperature for 2 hours. 50 mg (0.5 mmoles) of concentrated sulfuric acid (molar ratio acid:palladium=20:1) and 5 ml of water are then added to the resulting yellow solution.

The autoclave is pressurized with 3 atm of carbon monoxide and 62 atm of oxygen (molar ratio $CO:O_2=4.5:95.5$). The reaction is carried out under vigorous stirring, at a temperature of 50° C. After 1 hour the reactor is depressurized and the aqueous phase is separated from the organic phase. An aliquot (0.5 ml) of the aqueous phase is titrated with a solution of potassium permanganate to determine the concentration of hydrogen peroxide, which proves to be equal to about 1.2% by weight. This corresponds to an hourly turnover of palladium of 68.

EXAMPLE 2

Temperature effect

The reaction is carried out under the same operating conditions described in example 1, but using different temperatures. The results are shown in table 1.

TABLE 1

| Temperature °C. | $H_2O_2$ % | TN/h |
| --- | --- | --- |
| 20 | 0.3 | 18 |
| 30 | 0.5 | 28 |
| 40 | 0.7 | 43 |
| 50 | 1.2 | 68 |
| 60 | 1.6 | 95 |
| 70 | 2.1 | 122 |

The results show that the increase in temperature, within the stability limits of the $H_2O_2$, favours the reaction.

EXAMPLE 3

Effect of acids

The reaction is carried out under the same operating conditions described in example 1, but using different acids. The results are shown in table 2.

TABLE 2

| Acid | $H_2O_2$ | TN/h |
| --- | --- | --- |
| $H_2SO_4$ | 1.2 | 68 |
| $CF_3COOH$ | 0.85 | 50 |
| $Ph_2POOH$ | 0.6 | 33 |
| $CF_3SO_3H$ | 0.085 | 5 |
| $Me_3PhCOOH$ | 0.15 | 9 |
| $C_7F_{15}COOH$ | 1.3 | 75 |

The values indicated in table 2 show that the best results are obtained using sulfuric acid, $CF_3COOH$ and $C_7F_{15}COOH$.

EXAMPLE 4

Reaction with paratoluenesulfonic acid

The same procedure is carried out as in example 1, but using 7 ml of chlorobenzene and 0.5 mmoles of paratoluenesulfonic acid. An aqueous solution is obtained with a concentration of hydrogen peroxide of 0.6%, corresponding to an hourly turnover of palladium of 35 and an hourly productivity of 0.006 Kg/l of aqueous solution.

EXAMPLE 5

Effect of alcohols

The reaction is carried out as described in example 1, but using different types of alcohols. The results are shown in table 3.

TABLE 3

| ALCOHOL | $H_2O_2$ | TN/h |
| --- | --- | --- |
| ter-amylic | 0.17 | 10 |
| ter-butylic | 0.6 | 35 |
| n-amylic | 1.05 | 62 |
| n-butylic | 1.2 | 68 |
| n-propylic | 1.14 | 67 |
| methanol | 0.17 | 10 |

The values indicated in table 3 show that the alcohols which allow the best performances are n-butylic, n-amylic and n-propylic.

EXAMPLE 6

Effect of the quantity of alcohol

The reaction is carried out as described in example 1, but using different quantities of n-butanol with respect to the organic solvent. The results are shown in table 4.

TABLE 4

| | Chlorobenzene | |
| --- | --- | --- |
| Alcohol % | TN/h | $H_2O_2$ % |
| 20 | 48 | 0.8 |
| 50 | 68 | 1.2 |
| 60 | 90 | 1.5 |

The data show that the increase in alcohol has a favourable effect on the reaction yields.

EXAMPLE 7

Effect of solvents

The same procedure is carried out as in example 1, but using as organic phase a mixture of n-butanol and different types of solvents. The results are shown in table 5.

TABLE 5

| SOLVENT | $H_2O_2$ | TN/h |
| --- | --- | --- |
| chlorobenzene | 1.2 | 68 |
| dichloroethane | 0.7 | 40 |
| chloronaphthalene | 0.44 | 26 |
| 1,2,4-trichlorobenzene | 1.0 | 70 |
| toluene | 0.9 | 51 |
| methyl-terbutyl-ketone | 0.4 | 22 |
| methyl-sobutyl-ketone | 0.4 | 23 |
| acetophenone | 1.1 | 66 |
| p-fluoro-acetophenone | 1.2 | 70 |
| p-methyl-acetophenone | 1.0 | 59 |
| anisole | 1.0 | 59 |

The values indicated in table 5 show that the solvents which allow the best performances are chlorobenzene, 1,2, 4-trichlorobenzene, acetophenone, p-fluoro-acetophenone, p-methyl-acetophenone and anisole.

EXAMPLE 8

The reaction is carried out as described in example 1, but using different nitrogenated ligands. The results are shown in table 6.

TABLE 6

| Ligand | $H_2O_2$ % | TN/h |
|---|---|---|
| batocuproine | 1.2 | 68 |
| 2,4,6-tri(2-pyridyl)triazine | 0.1 | 8 |
| 2,9-dichloro-1,10-phenanthroline | 0.17 | 10 |
| 6,7-dimethyl-2,3-di(2-pyridyl)-quinoxaline | 0.09 | 5 |
| 2,9-dibutylphenanthroline | 0.5 | 30 |

EXAMPLE 9

Effect of the concentration of the acid

The reaction is carried out as described in example 1, but using different quantities of sulfuric acid. The results are shown in table 7.

TABLE 7

| millimoles of acid | molar ratio Acid:Pd | TN/h | $H_2O_2$ % |
|---|---|---|---|
| 0.125 | 5:1 | 65 | 1.1 |
| 0.25 | 10:1 | 66 | 1.1 |
| 0.5 | 20:1 | 68 | 1.2 |
| 1.0 | 40:1 | 68 | 1.2 |
| 1.5 | 60:1 | 69 | 1.2 |

The values indicated in table 7 show that on decreasing the quantity of acid the yield of $H_2O_2$ does not vary.

EXAMPLE 10

The reaction is carried out as described in example 1, but operating at 60° C. and with different molar ratios $CO:O_2$.

The experimentation is carried out using both pure oxygen and air. The results are shown in table 8.

TABLE 8

| | $O_2$ | | air | |
|---|---|---|---|---|
| CO% | TN/h | $H_2O_2$ % | TN/h | $H_2O_2$ % |
| 3.0 | 88 | 1.5 | 70 | 1.2 |
| 4.5 | 100 | 1.7 | 88 | 1.5 |
| 7.0 | 124 | 2.1 | 70 | 1.2 |
| 14.5 | — | — | 18 | 0.3 |
| 95.5 | 0 | 0 | 0 | — |

The values indicated in table 8 show that a moderate increase in the percentage of CO favours the reaction. The data also indicate that the reaction can also be carried out in the presence of air instead of pure oxygen.

EXAMPLE 11

Effect of the concentration of the ligand

The reaction is carried out as described in example 1, but using different concentrations of the ligand batocuproine. The results are shown in table 9.

TABLE 9

| Ligand:Pd | TN/h | % $H_2O_2$ |
|---|---|---|
| 20:1 | 31 | 0.5 |
| 8:1 | 52 | 0.9 |

TABLE 9-continued

| Ligand:Pd | TN/h | % $H_2O_2$ |
|---|---|---|
| 5:1 | 68 | 1.1 |
| 3:1 | 68 | 1.1 |

The values indicated in table 9 show that the best results are obtained using low molar ratios ligand:palladium.

EXAMPLE 12

5.6 mg (0.025 mmoles) of palladium acetate, 36 mg (0.1 mmoles) of batocuproine (molar ratio ligand:palladium= 4:1), 3 ml of 1,2,4-trichlorobenzene and 4 ml of n-butanol are charged into an autoclave equipped with a glass ampule and magnetic stirrer. The mixture is maintained under stirring, at room temperature for a night. 12.25 mg (0.125 mmoles) of concentrated sulfuric acid (molar ratio acid:palladium=5:1) and 5 ml of water are then added to the solution.

The autoclave is closed and charged with 7 atm of carbon monoxide and 70 atm of oxygen (molar ratio $CO:O_2$=9:91). The reaction is carried out under vigorous stirring, at a temperature of 70° C. After 1 hour the reactor is depressurized and the aqueous phase is separated from the organic phase. An aliquot (0.5 ml) of the aqueous phase is titrated with a solution of potassium permanganate to determine the concentration of hydrogen peroxide, which proves to be equal to 4.0% by weight. This corresponds to an hourly turnover of palladium of 236 and an hourly productivity of 0.040 Kg of hydrogen peroxide per liter of aqueous phase.

EXAMPLE 13

2.8 mg (0.0125 mmoles) of palladium acetate, 18 mg (0.05 mmoles) of batocuproine (molar ratio ligand:palladium=4:1), 3 ml of 1,2,4-trichlorobenzene and 4 ml of n-butanol are charged into an autoclave equipped with a glass ampule and magnetic stirrer. The mixture is maintained under stirring, at room temperature for a night.

25 mg (0.062 mmoles) of concentrated perfluoro-octanoic acid (molar ratio acid:palladium=5:1) and 5 ml of water are then added to the solution.

The autoclave is closed and charged with 7 atm of carbon monoxide and 70 atm of oxygen (molar ratio $CO:O_2$=9:91). The reaction is carried out under vigorous stirring, at a temperature of 70° C. After 1 hour the reactor is depressurized and the aqueous phase is separated from the organic phase. An aliquot (0.5 ml) of the aqueous phase is titrated with a solution of potassium permanganate to determine the concentration of hydrogen peroxide, which proves to be equal to 2.8% by weight. This corresponds to an hourly turnover of palladium of 332 and an hourly productivity of 0.028 Kg of hydrogen peroxide per liter of aqueous phase.

EXAMPLE 14

Reaction with recycles

The procedure described in example 12 is identically repeated for a total of 4 cycles, reusing each time the organic phase containing the palladium-ligand complex, separated from the aqueous phase, and reintegrating the acidified aqueous solution. At the second cycle the concentration of hydrogen peroxide is 3.9% corresponding to a turnover of 229; at the third cycle hydrogen peroxide is obtained at a concentration of 4.0%, corresponding to a turnover of 234; at the fourth cycle hydrogen peroxide is obtained at a concentration of 3.9%, corresponding to a turnover of 230. The average hourly productivity for a process of 4 consecutive cycles is 0.040 Kg of hydrogen peroxide per liter of aqueous solution, corresponding to an average concentration of 4% and to an average hourly turnover of 233.

EXAMPLE 15 (comparative)

The reaction is carried out as described in U.S. Pat. No. 4,711,772, by dissolving 5.6 mg (0.025 mmoles) of palladium acetate and 612 mg (2 mmoles) of triphenylarsine (molar ratio ligand:Pd=1:80) in 7 ml of 1,2,4-trichlorobenzene and leaving the mixture under stirring at room temperature for 30 minutes. 8 ml of water and 100 mg (1 mmole) of concentrated sulfuric acid (molar ratio acid:palladium=40:1) are added to the solution thus obtained.

The autoclave is closed and pressurized with 3 atm of CO and 62 atm of oxygen. The reaction is carried out at 20° C. under vigorous stirring. After 1 hour the reactor is depressurized and the phases separated. The concentration of hydrogen peroxide in the aqueous phase is 0.8% corresponding to a turnover of 76. The organic phase is again charged into the autoclave and reintegrated with 8 ml of water and 100 mg of concentrated sulfuric acid. The procedure is repeated for a total of 4 cycles, reusing each time the organic phase separated from the aqueous phase and reintegrating with 8 ml of aqueous solution of sulfuric acid. At the second cycle the concentration of hydrogen peroxide is 0.42% corresponding to a turnover of 40; at the third cycle hydrogen peroxide is obtained at a concentration of 0.31%, corresponding to a turnover of 29; at the fourth cycle hydrogen peroxide is obtained at a concentration of 0.15%, corresponding to a turnover of 14. FIG. 1 shows a comparison between the process with consecutive cycles described in example 13 and the comparative process.

We claim:

1. A process for the production of hydrogen peroxide which comprises reacting carbon monoxide, oxygen and water in an organic solvent immiscible with water, and in the presence of a catalytic complex soluble in the organic solvent which catalytic complex is the combination of:

(a) a salt of palladium;
   (b) a non-coordinating organic or inorganic acid; and
   (c) a ligand which is a compound capable of binding itself to the palladium atom, which ligand is a mono or polydentate nitrogenated compound.

2. The process according to claim 1, wherein the ligand is a monodentate nitrogenated ligand which is a nitrogenated heterocyclic compound selected from the group consisting of pyridine and alkylpyridine.

3. The process according to claim 1, wherein the ligand is a polydentate nitrogenated ligand having formula (I)

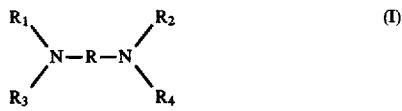

wherein: R represents a $C_2$–$C_4$ alkyl radical possibly substituted with an alkyl or aryl group; $R_1$–$R_4$, which may be the same or different, each represent a $C_1$–$C_{10}$ alkyl radical, a $C_3$–$C_{10}$ cycloalkyl radical or a $C_6$–$C_{12}$ aromatic radical possibly substituted with a $C_1$–$C_4$ alkyl or alkoxyl radical.

4. The process according to claim 1, wherein the nitrogenated ligand is a compound having formula (II):

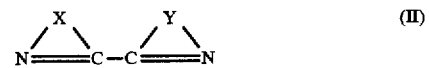

wherein: X and Y, which may be the same or different, each represent a bridging organic group having at least three atoms in the bridge of which at least two are carbon atoms.

5. The process according to claim 4, wherein groups X and Y each contain in the bridge at least one atom selected from the group consisting of oxygen and nitrogen.

6. The process according to claim 1, wherein the polydentate nitrogenated ligand is selected from the group consisting of N,N,N',N'-tetramethylethylenediamine-1,2; N,N,N',N'-tetramethylpropanediamine-1,3; 2,2'-bipyridyl; 4,4'-dimethyl-2,2'bipyridyl; 4,4'-diphenyl-2,2'bipyridyl; 5,5'-dimethyl-2,2'-bipyridyl; 5-methyl-2,2'-bipyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'-bioxazole; 2,2'-bipyrimidine; 2,2'-tetrahydro-bioxazole; 2,9-dichloro-1,10-phenanthroline; 2,9-dibutylphenanthroline 2,9-dimethylphenanthroline; 2,9-dimethyl-4,7-diphenyl-1,10-phenanthroline; 2,4,6-tri-(2-pyridyl)-1,3,5-triazine and 6,7-dimethyl-2,3-di(2-pyridyl)-quinoxaline.

7. The process according to claim 6, wherein the ligand is selected from the group consisting of 2,4,6-tri-(2-pyridyl)-1,3,5-triazine, 6,7-dimethyl-2,3-di(2-pyridyl)-quinoxaline and phenanthrolines substituted in position 2,9 selected from the group consisting of 2,9-dichloro-1,10-phenanthroline 2,9-dimethyl-4,7-diphenyl-1,10-phenanthroline and 2,9-dibutylphenanthroline.

8. The process according to claim 1, wherein the molar ratio ligand:palladium is between 1:1 and 20:1.

9. The process according to claim 8, wherein the molar ratio ligand:palladium is between 3:1 and 8:1.

10. The process according to claim 1, wherein the palladium salt is selected from the group consisting of palladium acetate, palladium nitrate and palladium sulfate.

11. The process according to claim 10, wherein the palladium salt is palladium acetate.

12. The process according to claim 1, wherein the concentration of palladium salt is between 0.001 and 0.5 moles of palladium salt per liter of organic phase.

13. The process according to claim 12, wherein the concentration of palladium salt is between 0.003 and 0.007 moles of palladium salt per liter of organic phase.

14. The process according to claim 1, wherein the acid is selected from the group consisting of p-toluenesulfonic acid, phosphoric acid, acetic acid, sulfuric acid, trifluoroacetic acid, benzoic acid, p-toluic acid, trimethylbenzoic acid, diphenylphosphinic acid and perfluoralkylcarboxylic acids having the formula $C_nF_{2n+1}COOH$ wherein n is between 5 and 15.

15. The process according to claim 14, wherein the acid is a perfluoralkylcarboxylic acid represented by the formula $C_nF_{2n+1}COOH$ wherein n is between 5 and 9.

16. The process according to claim 14, wherein the acids are selected from the group consisting of p-toluenesulfonic acid, sulfuric acid and perfluorooctanoic acid.

17. The process according to claim 1, wherein the molar ratio acid:palladium is between 1:1 and 60:1.

18. The process according to claim 17, wherein the molar ratio acid:palladium is between 3:1 and 20:1.

19. The process according to claim 1, wherein the organic solvent is selected from the group consisting of aliphatic hydrocarbons, aromatic hydrocarbons, aliphatic chlorinated hydrocarbons, aromatic chlorinated hydrocarbons, linear ethers, cyclic ethers, ketones, alcohols and their mixtures.

20. The process according to claim 19, wherein the organic solvent is selected from the group consisting of benzene, toluene, chlorobenzene, dichloromethane, dichlorethane, chloroform and chloronaphthaline, 1,2,4-trichlorbenzene, methyl-terbutyl-ketone, methyl-isobutyl-ketone, acetophenone, p-fluoroacetophenone, p-methylacetophenone, anisole and benzonitrile.

21. The process according to claim 19, wherein the organic solvent comprises an alcohol selected from the group consisting of primary, secondary and tertiary alcohols, each of which may be linear or branched, and each of which may be substituted by an alkyl or aryl residue.

22. The process according to claim 21, characterized in that the alcohol is selected from the group consisting of 2,6-dimethyl-4-heptanol, ter-amyl alcohol, ter-butyl alcohol, n-amyl alcohol, n-butanol, n-propanol and methanol.

23. The process according to claim 22, wherein the alcohol is selected from the group consisting of n-propanol, n-butanol and n-amyl alcohol.

24. The process according to claim 1, wherein when the non-coordinating acid is sulfuric acid and the solvent is a mixture consisting of an alcohol and an organic solvent non-miscible with water with a volumetric ratio of between 5:95 and 95:5.

25. The process according to claim 24, wherein the volumetric ratio alcohol/organic solvent non-miscible with water is between 50:50 and 60:40.

26. The process according to claim 1, wherein the reaction is carried out at a total pressure of more than 1 atm and with a molar ratio carbon monoxide:oxygen of between 1:99 and 12:88.

27. The process according to claim 26, wherein the pressure is between 5 atm and 100 atm and the molar ratio carbon monoxide:oxygen is between 3:97 and 10:90.

28. The process according to claim 1, wherein the reaction is carried out using air as the oxygen source.

29. The process according to claim 28, wherein the molar ratio carbon monoxide:oxygen is between 1:99 and 20:80.

30. The process according to claim 29, wherein the molar ratio carbon monoxide:oxygen is between 3:97 and 15:85.

31. The process according to claim 1, wherein the reaction is carried out at a temperature of between $-20°$ and $100°$ C.

32. The process according to claim 31, wherein the temperature is between $20°$ C. and $80°$ C.

33. The process according to claim 1, wherein the catalytic complex is preformed.

34. The process according to claim 1, which is carried out continuously while removing the hydrogen peroxide and the $CO_2$ and reintegrating the reagents.

* * * * *